United States Patent
Tegethoff

(12)
(10) Patent No.: US 6,925,175 B2
(45) Date of Patent: Aug. 2, 2005

(54) LONG-HAUL PATH LENGTH DELAY ESTIMATOR AND COMPENSATOR FOR AN ECHO CANCELLER

(75) Inventor: Ronald H. Tegethoff, Tinton Falls, NJ (US)

(73) Assignee: NMS Communications Corporation, Framingham, MA (US)

(*) Notice: Subject to any disclaimer, the term of this patent is extended or adjusted under 35 U.S.C. 154(b) by 291 days.

(21) Appl. No.: 10/259,130

(22) Filed: Sep. 27, 2002

(65) Prior Publication Data

US 2003/0190040 A1 Oct. 9, 2003

Related U.S. Application Data

(60) Provisional application No. 60/368,744, filed on Mar. 29, 2002.

(51) Int. Cl.[7] .................................................. H04M 9/08
(52) U.S. Cl. .............................. 379/406.01; 379/406.02; 379/406.06; 379/406.8; 379/406.09
(58) Field of Search ......................... 379/406.01–406.16

(56) References Cited

U.S. PATENT DOCUMENTS 4,587,382 A * 5/1986 Yang ........................... 370/291
5,473,686 A * 12/1995 Virdee ..................... 379/406.08
6,243,462 B1 * 6/2001 Chujo et al. ............. 379/406.1
2002/0131583 A1 * 9/2002 Lu

* cited by examiner

Primary Examiner—Xu Mei
Assistant Examiner—Ramnandan Singh
(74) Attorney, Agent, or Firm—Michaelson & Associates; Peter L. Michaelson

(57) ABSTRACT

Apparatus and accompanying methods for use in a long-haul echo control device to automatically measure sufficient changes in path length and compensate a long-haul echo canceller for resulting variations in echo occurring over a path. The apparatus measures a round-trip path delay interval of, e.g., a predefined signaling tone(s) sent between international switching centers while establishing an outbound call connection over the path. Once the delay is measured, the apparatus sets echo delay of a corresponding long-haul echo canceller to accommodate that delay. For a multi-channel facility (e.g., T1 or E1), path delay is separately measured for each channel on that facility, and then the apparatus changes the echo delay to the same amount for the corresponding echo canceller associated with each and every channel on that facility.

42 Claims, 4 Drawing Sheets

LONG-HAUL PATH LENGTH DELAY ESTIMATOR AND COMPENSATOR FOR AN ECHO CANCELLER

CLAIM TO PRIORITY

This application claims priority of my co-pending United States provisional patent application entitled "Echo Path Change Detector for the Long Haul Echo Canceller" filed Mar. 29, 2002, accorded Ser. No. 60/368,744 and which is incorporated by reference herein.

BACKGROUND OF THE DISCLOSURE

1. Field of the Invention

The invention relates to apparatus for use in a long-haul echo control device, as well as accompanying methods for use therein, and particularly, though not exclusively, such a device which is intended for use with long-haul telecommunication facilities and which can automatically measure significant changes in length of a path and compensate for resulting variations in echo occurring over that path.

2. Description of the Prior Art

Echo is a common occurrence in a long haul telecommunications path. Echo typically arises owing to impedance mismatches at either end of that path, with its duration being a function of path length. In essence, as the path length increases, so does the duration of the echo.

Traditional echo control over an international telecommunications path that connects two international telecommunication administrations, and particularly a path that extends between two international switching centers (ISCs), has involved situating an echo control device (a so-called echo canceller) at each ISC. Each canceller controls the echo generated within its own corresponding domestic network. In those domestic networks that incorporate sophisticated echo cancellers, this approach functions quite well to control echo generated over connections occurring just within those networks.

However, for those telecommunications paths that extend from one ISC to another, users at one ISC, i.e., a "near-end ISC", will depend on the performance of an echo canceller (a "far-end" echo canceller) situated at the far-end ISC. Consequently, that dependence has led to rather deficient performance.

First, in many countries, particularly in economically developing areas of the world, their telecommunications networks, particularly their ISCs, may not even contain echo cancellers. Second, what echo cancellers that do exist in those regions may function rather poorly or provide widely differing levels of performance. Consequently, long haul paths that rely on those ISCs are often plagued by echo.

To surmount these deficiencies, it is widely known in the art to position both near- and far-end echo cancellers, rather than at separate corresponding ISCs, at a single ISC, i.e., the near-end ISC. The near-end echo canceller controls locally generated echo; while, the far-end, or here long-haul, echo canceller controls echo generated at the far-end of the path—thus eliminating a need to rely on echo cancellers at the far-end ISCs. But even this approach carries its own limitations.

Specifically, when a long-haul path, such as a fiber cable, fails, that path could be restored over circuits that have markedly different path lengths and propagation delays than the failed cable; hence, yielding hard echo. For example, an undersea cable that suffered a break may be restored through a geostationary satellite link. While the cable may extend a few thousand miles between ISCs, a satellite link may extend on the order of 44,000 miles between ISCs (approximately 22,000 miles from one earth station to the satellite and a similar amount back down to a different earth station). This is the delay experienced by a listening party. The echo experienced by a speaking party is double this delay since the transmitted speech must once again traverse the same facility. In such instances, the widely different path lengths can result in substantial changes in echo delay. Unfortunately, international administrations rarely, if ever, provide any feedback information to each other regarding cable breaks or changes in path length. Therefore, an ISC situated at one-end of an international call rarely, if ever has knowledge, of changes in path length or delay as a result of call restoration events occurring at the other end.

Consider the following example. If the long haul facility consists of 11,200 miles (approximately 7000 km) of fiber cable between Administration A and B and Administration B's maximum internal practical facility mileage is on the order of 625 miles (approximately 1000 km), then round-trip delay for the far-end echo canceller is calculated as follows:

Round Trip Long Haul Delay $(LHD)$=Total one-way distance (km)×(0.01 ms/1 km)

where: 0.01 ms/km is a round trip delay factor per unit length of fiber facility.

Here, the LHD=7000 km×(0.01 ms/1 km) or approximately 70 ms. As such, the far-end echo canceller must provide at least 70 ms of tail delay. In addition, within Administration B's network, the maximum Network Delay (ND) is calculated as follows:

Round Trip maximum Network Delay $(ND)$=Total one-way distance (km)×(0.01 ms/1 km)

Hence, ND=1000 km×(0.01 ms/1 km) or a maximum of 10 ms. Accordingly, the far-end echo canceller must provide between 70 to 90 ms of tail delay. This amount of delay can be readily provided by conventional echo cancellers. Now, let us assume that the long haul facility fails and the 7000 km fiber cable route is restored using a geostationary satellite. Since the satellite is approximately 22,000 miles in space (approximately 36,000 km) the facility mileage is now 72,000 km. Also since the satellite facility traverses air or free space instead of fiber cable, the round trip delay factor free space is 0.008 ms/km. Given this, the satellite LHD becomes 72,000 km×(0.008 ms/km) or 576 ms and a range of ND is 0 to 10 ms. The total round trip delay range is 576 to 586 ms. This amount of delay will produces rather hard echo for callers served by Administration A; thus significantly degrading call quality.

Consequently, in such installations, any significant resulting change in echo delay, such as from 80 ms to approximately 600 ms, must be handled by a technician at a near-end location who manually sets the long-haul echo canceller to accommodate that new delay value. But, once the failed path is restored, which could happen relatively quickly, the technician must then manually re-set the long-haul echo canceller back to its prior delay value. Not surprisingly, this approach, being highly labor-intensive, is rather impractical.

Therefore, a need exists in the art for an echo canceller, and particularly apparatus and accompanying methods for use therein, that can readily and automatically compensate for sufficient, e.g., significant, changes in long-haul path length and can be stationed along with a near-end echo canceller at a common end of the path. Advantageously, not only would such a resulting echo canceller provide proper response to changes in path length but also it would significantly reduce, if substantially eliminate, a need for manual intervention that would otherwise occur.

SUMMARY OF THE INVENTION

The present invention advantageously satisfies this need by imparting a capability within an echo control device to measure path delay associated with the long haul path connecting two international switching centers. This is advantageously accomplished, within the device, by measuring path delay, e.g., round-trip path delay interval of a predefined signalling tone(s) sent between the international switching centers and illustratively during the course of establishing an outbound call connection, from one of those centers to the other, over that path. Once this delay interval is measured, an echo canceller within the device is set to provide a commensurate amount of echo delay.

In accordance with my inventive teachings, the inventive apparatus measures the path delay for each of 24 or 31 channels for a corresponding T1 or E1 facility carried over a common physical link. For each channel, this measurement occurs during a call set-up interval associated with that channel. In the event a sufficient change in the path delay is detected during a call set-up interval for any of these channels, the inventive apparatus changes the echo delay for the corresponding echo canceller for each one of the channels such that the same echo delay is used across all the channels of the T1 or E1 facility. Consequently, over time, as outbound calls are successively carried over a different facility, the echo delay used for all the channels of the T1 or E1 facility effectively and automatically changes to track changes in the path length of the link which implements that facility, thus providing a proper amount of echo given a current length of the link presently carrying that facility. Should the path length change again, then during the ensuing call set-up interval for the next successive call carried over any channel in that facility, the path delay will be measured and the appropriate echo delay set for all the echo cancellers that serve the channels in the facility, and so forth.

Specifically, the present invention preferably and for implementational simplicity utilizes a pre-defined and standard supervisory signaling tone sequence that is transmitted between international administrations during the call set-up interval. Path delay is measured as a time difference occurring from the time a predefined (outbound) supervisory tone is transmitted from the near-end administration to the far-end administration where the tone is looped back and returned to the originating administration to a time that that predefined supervisory tone is returned by the far-end administration and is first received, as an inbound tone, by the near-end administration. Illustratively, the outbound and inbound tone may be the same tone, e.g., a 2000 Hz continuity check (CC) tone or a voice path assurance (VPA) tone, as are used within ITU-T No. 7 signaling standard for international call signaling, or different tones, as in the case of, e.g., 2400 Hz and 2600 Hz, "Seizure" and "Proceed to Send" tones, respectively and collectively, utilized under the ITU-T No. 5 signaling standard.

BRIEF DESCRIPTION OF THE DRAWINGS

The teachings of the present invention can be readily understood by considering the following detailed description in conjunction with the accompanying drawings, in which.

To facilitate understanding, identical or similar reference numerals have been used, where possible, to designate identical or similar elements, respectively, that are common to the figures.

DETAILED DESCRIPTION

After considering the following description, those skilled in the art will readily appreciate that the teachings of my present invention can be utilized in any telecommunications facility that carries multiple separate channels in a multiplexed manner, such as a T1, E1 or other facility. For the sake of convenience, I will specifically discuss my invention in the context of its use with an E1 facility, i.e., having 31 multiplexed voice-grade channels, as such facilities are very common in carrying telecommunications traffic on an worldwide basis; while T1 facilities, on the other hand, having 24 channels (rather than 31) find predominant use in North America.

Figure 1:
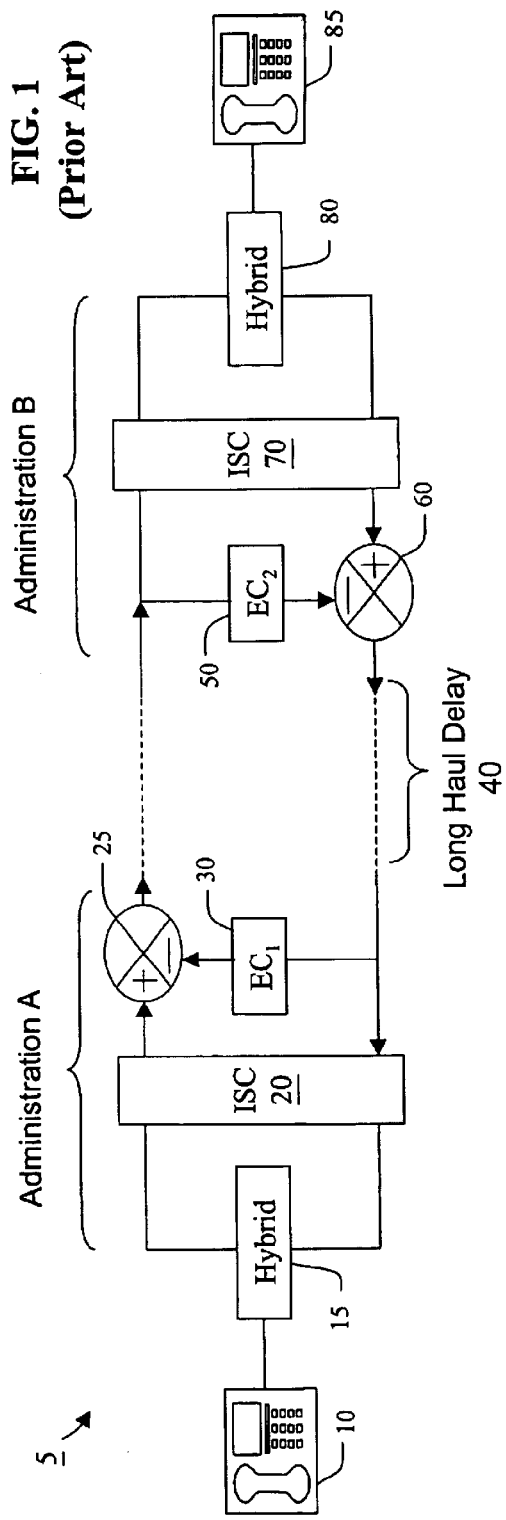
FIG. 1 depicts conventional arrangement 5 for a single direction of a long haul bi-directional transmission communication channel employing both near- and far-end echo control devices located at corresponding near and far-end Administrations A and B, respectively.

FIG. 1 depicts a traditional approach, arrangement 5, for controlling echo over a long-haul international communications path that connects two call administrations, here near-end administration A and far-end administration B. For simplicity, this figure (as well as FIG. 2) depicts just one channel of a common facility (an E1 facility) carried over that path, as well as communication in one direction over that facility.

As shown, Administration A, at a near-end location, services a caller situated at telephone 10; while Administration B, at a far-end location, services a caller situated at telephone 85. To the extent relevant, both administrations contain, at a very high level, the same components: a hybrid, an international switching center (ISC), an echo control device which contains a summer (25, 60) and an associated echo canceller (EC) (30, 50). Since the corresponding components at each administration operate in the same manner, I will simply focus on Administration A.

For simplification, ISC 20 contains an entire domestic telephone switching and facility network. At the near-end location, hybrid 15 converts incoming and outgoing four wire voice-grade analog communication for telephone 10 that appears on two separate physical ports, associated with ISC 20, for transmission over a two wire local loop to that telephone. To establish a call between telephones 10 and 85, ISCs 20 and 70, acting in unison, first establish ("set-up") a bi-directional communication path between themselves that is formed of two separate channels. Outbound communication from telephone 10 to telephone 85 utilizes one of these two channels—a so-called "outbound" channel relative to telephone 10 (assuming telephone 10 initiates a call); while inbound communication to telephone 10 from telephone 85 utilizes the other channel—a so-called "inbound" channel. As to the former, ISC 20 digitizes the analog communication it receives from telephone 10, via a receive port of hybrid 15, routes resulting digital communication to the outbound channel, and finally transmits the ensuing digital communication over that channel to the destination ISC. ISC 20 also operates in reverse to accept inbound communication associated with this call and convert that communication occurring over the inbound channel into analog communication that is, in turn, routed to one port of hybrid 15 and ultimately to telephone 10 itself.

For international calls, ISCs 20 and 70 are typically connected through a long-haul facility path, such as an undersea cable or a satellite transmission medium, here symbolized by dashed lines. That path, being that it often stretches thousands or tens of thousands of miles has a long haul delay associated with it, here simply depicted as long haul delay 40. Echo typically arises owing to unavoidable impedance mismatches from hybrids 15 and 40 at either end of that path which, in turn causes signal reflections. Duration of the echo is a function of path length. In essence, as the path length increases, so does echo delay duration.

Traditional echo control over a long-haul path has involved situating an echo control device (a so-called echo canceller) at each ISC. Here, echo cancellers 30 and 50 (also labeled $EC_1$ and $EC_2$) are deployed at ISCs 20 and 70, respectively. Each of these cancellers controls the echo generated within its own corresponding domestic network.

To eliminate echo, each echo control device (situated at its own near-end location) generates a mirror image of a signal it receives from its own far-end location and negatively sums that image with a locally originated signal to yield a resultant signal that is transmitted to that far-end location. Echo cancellation is employed on each channel used by a call to control echo associated with communication carried in a given direction from one end of that call to another. For purposes of simplification, FIGS. 1 and 2 will only show one out of up to 31 voice channels that are used to carry bi-directional communication between telephones 10 and 85 and specifically for the outbound communication from telephone 10.

Outgoing digitized communication from the caller speaking at telephone 85 is routed through hybrid 80 to ISC 70, the positive input of summer 60 and sampled by $EC_1$ 30. The digitized communication continues to ISC 20, hybrid 15 and is eventually applied, as an analog signal, to a listener at telephone 10. At hybrid 15 echo is generated. This echo goes through ISC 20 in an opposite direction and is applied to a positive input of summer 25. Whenever this echo occurs, $EC_1$ 30 will delay and attenuate its monitored input signal (i.e., an echo component). Next, signals at the positive and negative inputs of summer 25 are differentially combined. A resultant vector sum of these two signals is zero and echo cancellation has occurred. This means that a speaking party at telephone 85 will not hear echo of his (her) speech. Similarly, $EC_2$ and summer 60 operate in the same manner to control echo when the speaking and listening roles of the parties at telephones 10 and 85 are reversed.

Unfortunately, callers served by, e.g., ISC 20, depend on the performance of the echo control device formed of $EC_2$ 50 and summer 60 which are situated at ISC 70, and vice versa. If appropriately sophisticated echo cancellation equipment is present at both ISCs, then this dependence is of no concern. However, such is not always the case, particularly in many developing areas of the world where, in their ISCs, echo cancellation equipment is not used or, if used, functions rather poorly or provides widely differing levels of performance. Accordingly, long haul paths for international calls are often plagued by echo.

Figure 2:
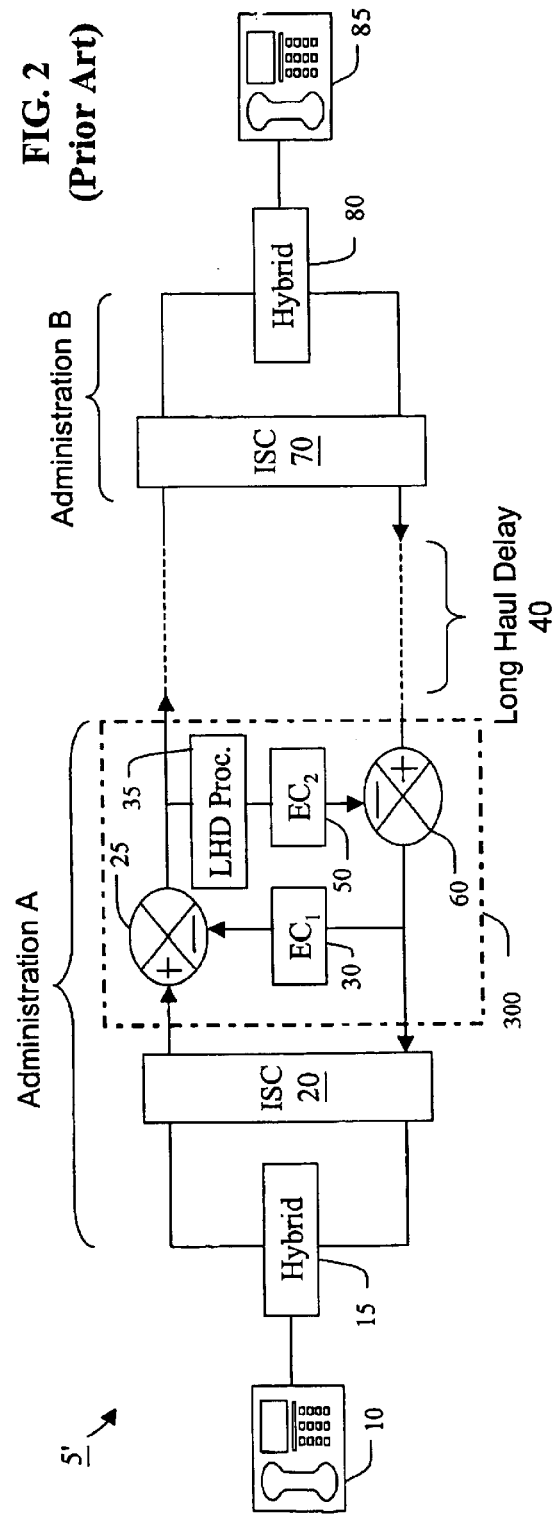
FIG. 2 depicts conventional arrangement 5' for a single direction of a long haul bi-directional transmission communication channel but where both near- and far-end (long haul) echo control devices are situated at near-end Administration A.

FIG. 2 depicts, as arrangement 5', one conventional solution. Here, both a far-end echo control device, i.e., canceller 50 ($EC_2$) and summer 60, and a near-end echo control device, i.e., canceller 30 ($EC_1$) and summer 25, are positioned at near-end ISC 20, hence forming echo control device 300, rather than at their corresponding ISCs (as is the case for arrangement 5 shown in FIG. 1). Near-end canceller $EC_1$ controls locally generated echo; while far-end, or here long-haul, canceller $EC_2$ controls echo generated at the far-end of the path. Arrangement 5' also includes long haul delay processor 30 connected to canceller $EC_2$.

However, when a long-haul path, such as a cable, fails, that path could be restored over circuits that have markedly different path lengths than the failed cable. For example, an undersea cable that suffered a break may be restored through a geostationary satellite link. While the cable may extend a few thousand miles between ISCs, a satellite link may extend on the order of 44,000 miles between ISCs (approximately 22,000 miles from one earth station to the satellite and a similar amount back down to a different earth station). The speech and the returning echo mean the echo traverses 88,000 miles. In such instances, the widely different path lengths can result in substantial changes in echo delay. Unfortunately, international administrations rarely, if ever, provide any feedback information to each other regarding cable breaks or changes in path length. Consequently, any resulting changes in echo delay must be handled by a technician at a near-end location who manually sets the long haul delay (LHD) processor 30 connected to canceller 50 and summer 60, that comprise the echo control device, to accommodate that new delay value. But, once the failed path is restored, which could happen relatively quickly, the technician must then manually re-set the LHD processor 30 of the long-haul portion of echo canceller 300 back to its prior delay value. Not surprisingly, this approach, being highly labor-intensive, is rather impractical.

The present invention advantageously remedies these problems by imparting a capability within an echo control device to measure round-trip path delay of a long haul path that connects two international switching centers. Specifically, this delay is measured during the course of establishing an outbound call connection over that path. Once this delay interval is measured, a far-end (long-haul) echo canceller in that device is set to provide a commensurate amount of echo delay.

In accordance with my inventive teachings, the inventive apparatus measures the path delay for each channel for all 31 voice channels of the E1 facility carried over a common physical link. For each channel, this measurement occurs during a call set-up interval associated with that channel. In the event a sufficient change in the path delay is detected during a call set-up interval for any channel, the inventive apparatus changes the echo delay for the other 30 voice channels of echo cancellation such that the same echo delay is used across all 31 voice channels that form the E1 facility. Consequently, over time, as calls are successively carried over different physical links, the echo delay used for all the channels effectively and automatically follows changes in the path length of the link which last changed in delay value for that facility, thus providing a proper amount of echo given a current length of the link presently carrying that facility. Should the path length change again, then during the ensuing call set-up interval for the next successive outbound call carried over any channel in that facility, the path delay will be measured and the appropriate echo delay set for all the echo cancellers that serve the channels in the facility, and so forth.

Specifically, the present invention preferably and for implementational simplicity utilizes a pre-defined and standard supervisory signaling tone sequence that is transmitted between domestic or international administrations during the call set-up interval. Path delay is measured as a time difference occurring from a time a first predefined (outgoing) supervisory tone is transmitted from the near-end administration to the far-end administration to a time that a second predefined (incoming) responsive supervisory tone is returned by the far-end administration and is first received by the near-end administration. Illustratively, the outbound and inbound tones may both be a 2000 Hz continuity check (CC) voice path assurance (VPA) tone, as are used within ITU-7 No. 7 standard for international call signaling, or 2400 Hz and 2600 Hz, "Seizure" and "Proceed to Send" tones, respectively and collectively, utilized under the ITU-T No. 5 standard.

Figure 3:
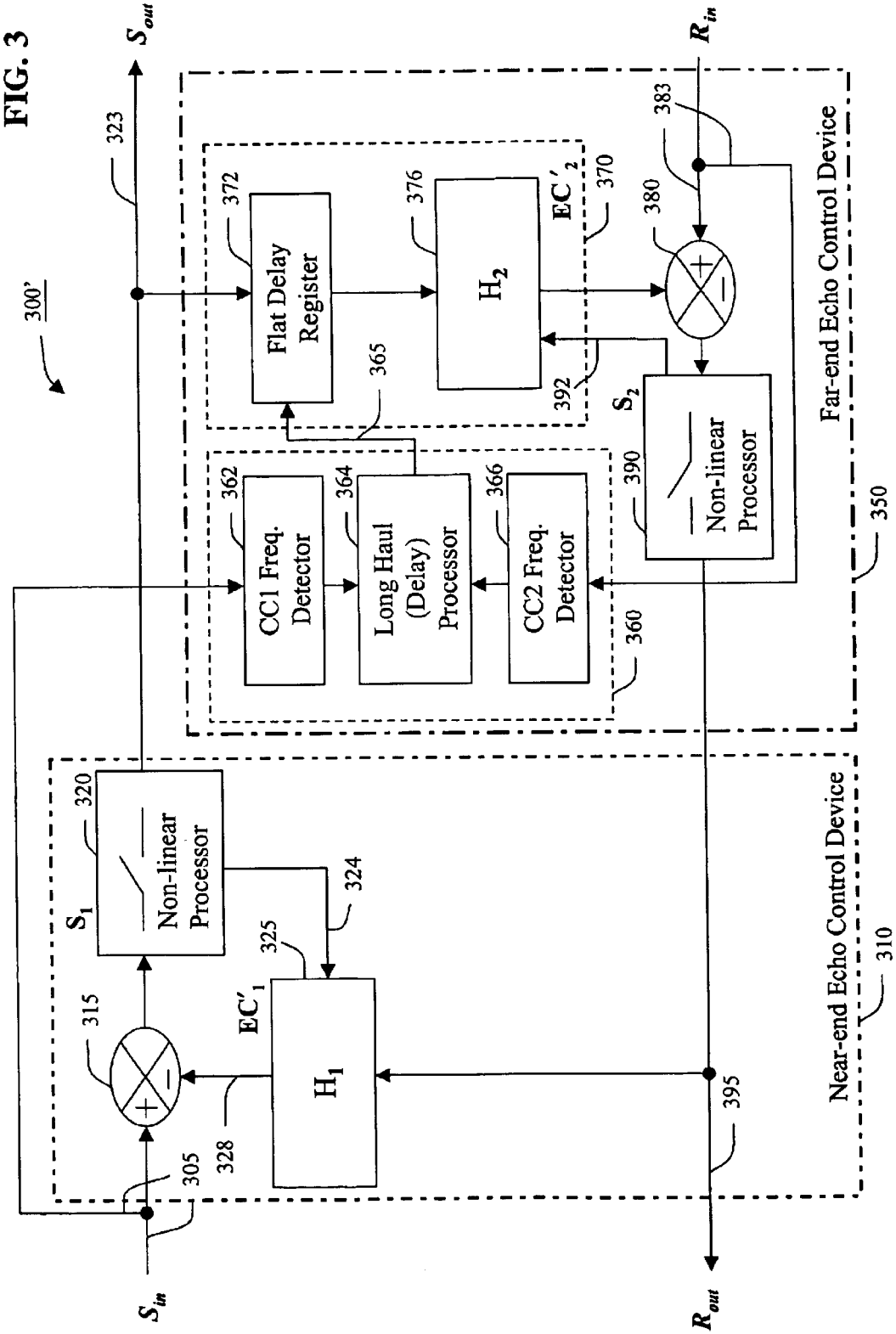
FIG. 3 depicts my inventive echo control device 310 and 350, corresponding to echo control device 300 shown in FIG. 2, for detecting changes in long-haul path length and compensating performance of the far-end (long-haul) echo canceller therein.

FIG. 3 depicts my inventive echo control device 300', corresponding to device 300 shown in FIG. 2, for detecting changes in long-haul path length and compensating performance of the far-end (long-haul) echo canceller therefor.

As depicted, echo control device 300' contains near-end echo control device 310 and far-end echo control device 350. Device 310 is formed of conventional echo canceller 325 (also labeled at $EC'_1$) which itself contains echo adaptation register $H_1$), summer 315 and non-linear processor 320. Device 350 is formed of circuitry 360, itself containing CC1/CC2 frequency detectors 362 and 366, respectively, and long haul processor 364; far-end echo canceller 370, summer 380 and non-linear processor 390.

Within echo control device 310, canceller 325 and summer 315 function identically to canceller 30 and summer 25 shown in FIGS. 1 and 2 and discussed above. Since echo canceller 325 is conventional and well-known to those skilled in the art, I will not discuss it in any further detail. Non-linear processor 320 (basically a switch control, hence also designated as $S_1$) disables, via control line 324, the operation of canceller 325 whenever a detected level of echo decreases below −30 db, thus substantially eliminating any residual echo. Inasmuch as non-linear processor 320, as well as non-linear processor 390 (also designated as $S_2$) which generates a similar control signal on line 392 to disable far-end echo canceller 376, is conventional and well-known in the art, I will also not discuss either processor 320 or 390 any further.

Within device 350, circuitry 360 detects the pre-defined signalling tone(s) present during the call-setup interval and measures path delay.

Under the ITU-T No. 7 signalling system—which is rather prevalent worldwide, a 2000 Hz tone is sent by an originating ISC, for every call it initiates, to a destination ISC to check continuity (CC) of a channel connection established therebetween and provide proper voice path assurance over that connection. Since this tone is provided by each ISC, with one providing its tone in response to the same tone received from the other, I find it especially convenient to use these pre-existing tones in measuring path delay. In particular, circuit 360 simply detects a time interval starting from a time when its associated near-end ISC (ISC 20 shown in FIG. 2) transmits its outgoing CC tone to a time when such a (incoming) tone is received, over the channel, from the far-end ISC (e.g., far-end ISC 70 also shown in FIG. 2). In particular, to detect the outgoing tone, CC1 frequency detector 362 is connected to line 305. This line forms an $S_{in}$ (send in) input lead of echo control device 310 and hence provides the outgoing signal from the ISC that is to be transmitted over the long-haul path. To detect the incoming tone from the far-end ISC, CC2 frequency detector 366 (where here illustratively the CC1 and CC2 tones are of the same frequency, though clearly they need not be) is connected to line 383 which provides an $R_{in}$ (receive in) input lead of echo control device 310. Line 383 routes the incoming far-end signal from the long-haul path to echo control device 310. Detection outputs of detectors 362 and 366 are routed to long haul processor 364 (the logical operation of is discussed in detail below in conjunction with FIG. 5) which, in turn and through an internal timer, times the interval between an outgoing CC tone on line 305 and its returned tone on line 383. The output of processor 364, is routed as symbolized by line 365, to far-end echo control device 370 as the round-trip long haul delay value and, if sufficient, changes the delay interval provided by flat delay register 372 situated within far-end echo canceller 370. Flat delay register 372 delays outgoing signals appearing on line 323 prior to their application, as input, to remainder 376 of echo canceller 370 ($EC_2$) which itself contains echo adaptation register $H_2$. Inasmuch as the remainder of this echo canceller is conventional and identical to echo canceller 325, I will not discuss it in any further detail.

Within long haul processor 364, the measured value is compared to and, if sufficiently different from a value already set in flat delay register 372, updates the latter with the new value (as well as the value used in every other corresponding flat delay register for every other channel with the entire E1 facility). Since only sufficient, i.e., significant, changes in delay are of interest—hence indicating a gross change in path length, then a window (range) of delay time is established and centered at the present value stored in flat delay register 372. That window, though not critical, may be on the order of ±5% (or more) of the currently stored value. Should the path length (delay), as currently measured, deviate outside this bound for any value then stored within register 372, the register is then updated to the currently measured value; otherwise, the register is not updated.

For those facilities where ITU-T No. 5 signaling, rather than No. 7, is deployed, the same delay monitoring concept can be utilized, though using different signalling tones (F1 and F2 rather than CC1 and CC2), to detect and update the value in the flat delay register for changes in the long haul facility delay. Table A below provides an overview of the supervisory signaling tone sequences that can be used and the times during which these tones exist and must be detected (recognized). For these signals, frequencies (freq) F1 and F2 are 2400 and 2600 Hz, respectively.

TABLE A

| # | Signal | Direction | Freq. | Sending Duration | Recognition Time |
|---|--------|-----------|-------|------------------|------------------|
| 1 | Seizure | → | F1 | Continuous | 40 +/− 10 ms |
|   | Proceed to Send | ← | F2 | Continuous | 40 +/− 10 ms |
| 2 | Busy Flash | ← | F2 | Continuous | 125 +/− 25 ms |
|   | Acknowledgment | → | F1 | Continuous | 125 +/− 25 ms |

TABLE A-continued

| # | Signal | Direction | Freq. | Sending Duration | Recognition Time |
|---|--------|-----------|-------|------------------|------------------|
| 3 | Answer | ← | F1 | Continuous | 125 +/− 25 ms |
|  | Acknowledgment | → | F1 | Continuous | 125 +/− 25 ms |
| 4 | Clear Back | ← | F2 | Continuous | 125 +/− 25 ms |
|  | Acknowledgment | → | F1 | Continuous | 125 +/− 25 ms |
| 5 | Forward Transfer | → | F2 | 850 +/− 200 ms | 125 +/− 25 ms |
| 6 | Clear Forward | → | F1 & F2 | Continuous | 125 +/− 25 ms |
|  | Release Guard | ← | F1 & F2 | Continuous | 125 +/− 25 ms |

The right arrow (→) signifies forward (outbound) signals; the left arrow (←) signifies backward (inbound, i.e., returned) signals.

From all of the six compelled signaling exchanges listed in Table A, sequence 1 is preferable. The "Seizure-Proceed to Send" sequence, shown as sequence 1, occurs at the start of every call and will be completed before the call begins to ring. However, a shortcoming of using this particular sequence is that the tone detectors will only have 40 ms±10 ms to correctly detect the "Seizure-Proceed to Send" tones.

As noted above, separate circuitry (illustratively circuitry 360 shown in FIG. 3) is used to measure the path length (delay) for each channel in an E1 facility with any sufficient change to the measured length for any one channel in that facility then being used to set the delay associated with the far-end (long-haul) echo cancellers for all the channels in that facility.

Figure 4:
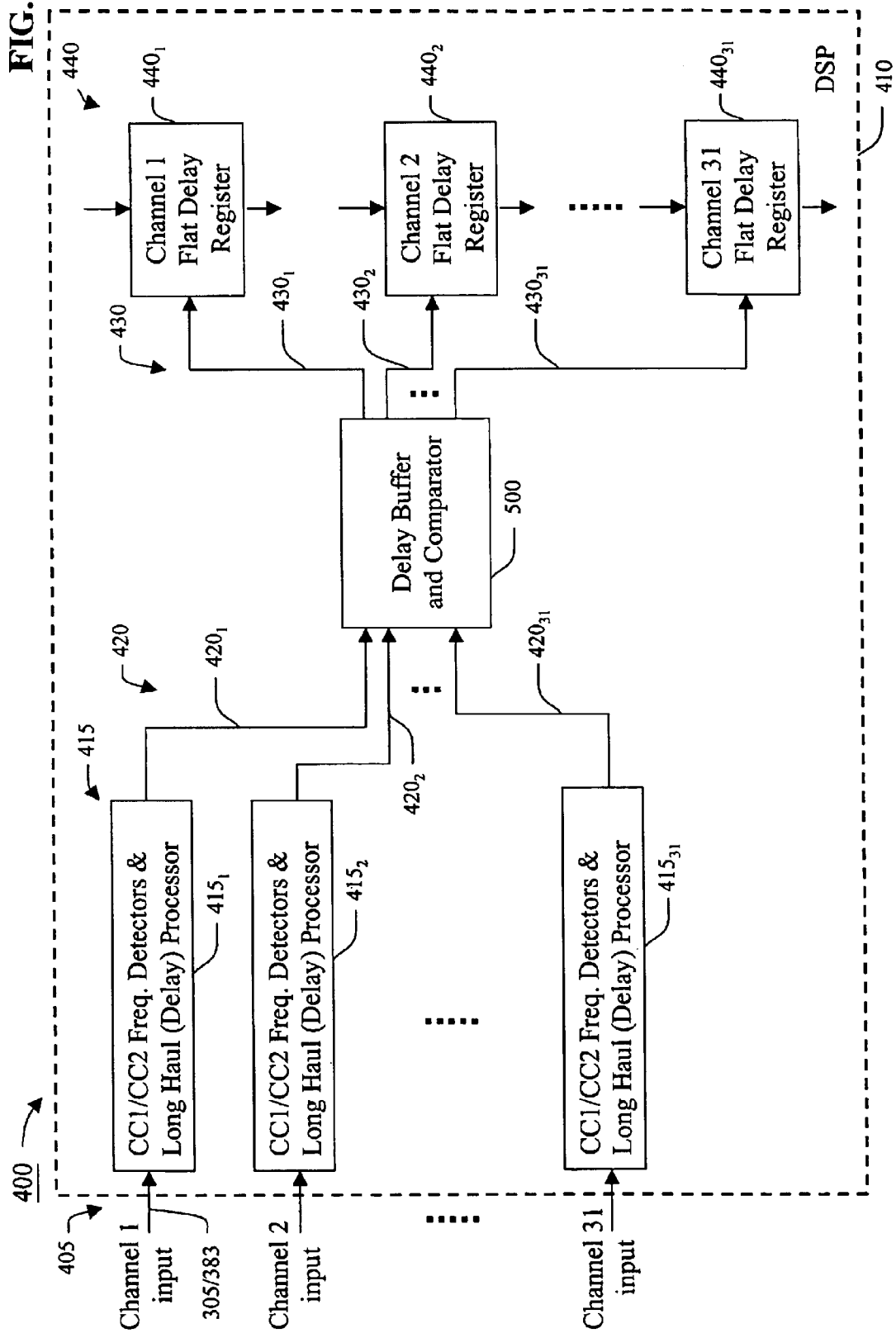
FIG. 4 depicts a high-level block diagram of my inventive apparatus as it would be typically implemented for use with a multi-channel communication facility, such as, e.g., a 31 voice channel E1 facility.

FIG. 4 depicts a high-level block diagram of inventive apparatus 400 which accomplishes this function.

As shown, $S_{in}$ and $R_{in}$ inputs for each of thirty channels are collectively applied, via lines 405, to a separate corresponding one of CC1/CC2 frequency detectors and long haul processors 415. For Channel 1, and consistent with that shown in FIG. 3, lines 305 and 383 route the inputs ($R_{in}$ and $S_{in}$) to inputs of CC1/CC2 frequency detectors and long haul processor $415_1$ associated with that particular channel. Similarly, input signals for Channel 2, . . . , Channel 31 are applied to CC1/CC2 frequency detectors and long haul processors $415_2$, . . . , $415_{31}$, respectively. The delay values determined by all the long haul processors are then applied, collectively via leads 420 consisting of leads $420_1$, $420_2$, . . . , $420_{31}$ respectively connected to CC1/CC2 frequency detectors and long haul processors $415_1$, $415_2$, . . . , $415_{31}$, to delay buffer and comparator 500. Circuit 500 compares each newly measured delay value against a common value then stored in flat delay registers 440 associated with all of the far-end echo cancellers for that facility. Registers 440 are formed of registers $440_1$, $440_2$, . . . , $440_{31}$ with each of these registers resident within and providing flat input delay for a corresponding different one of these echo cancellers. Circuit 500 determines which of the newly measured values differs the most, either positively or negatively, from the common value, and then determines whether that newly measured value is sufficiently different from the common value, i.e., outside the predefined window centered about that common value. If that particular measured value is sufficiently different, then circuit 500, via leads 430 (formed of leads $430_1$, $430_2$, . . . , $430_{31}$ feeding flat delay registers $440_1$, $440_2$, . . . , $440_{31}$, respectively), sets the delay provided by each of these flat delay registers to that newly measured value.

For simplicity, circuits 415 and 500 are preferably implemented by appropriate software routines executed by a single digital signal processor (DSP) circuit as indicated by dashed block 410.

Figure 5:
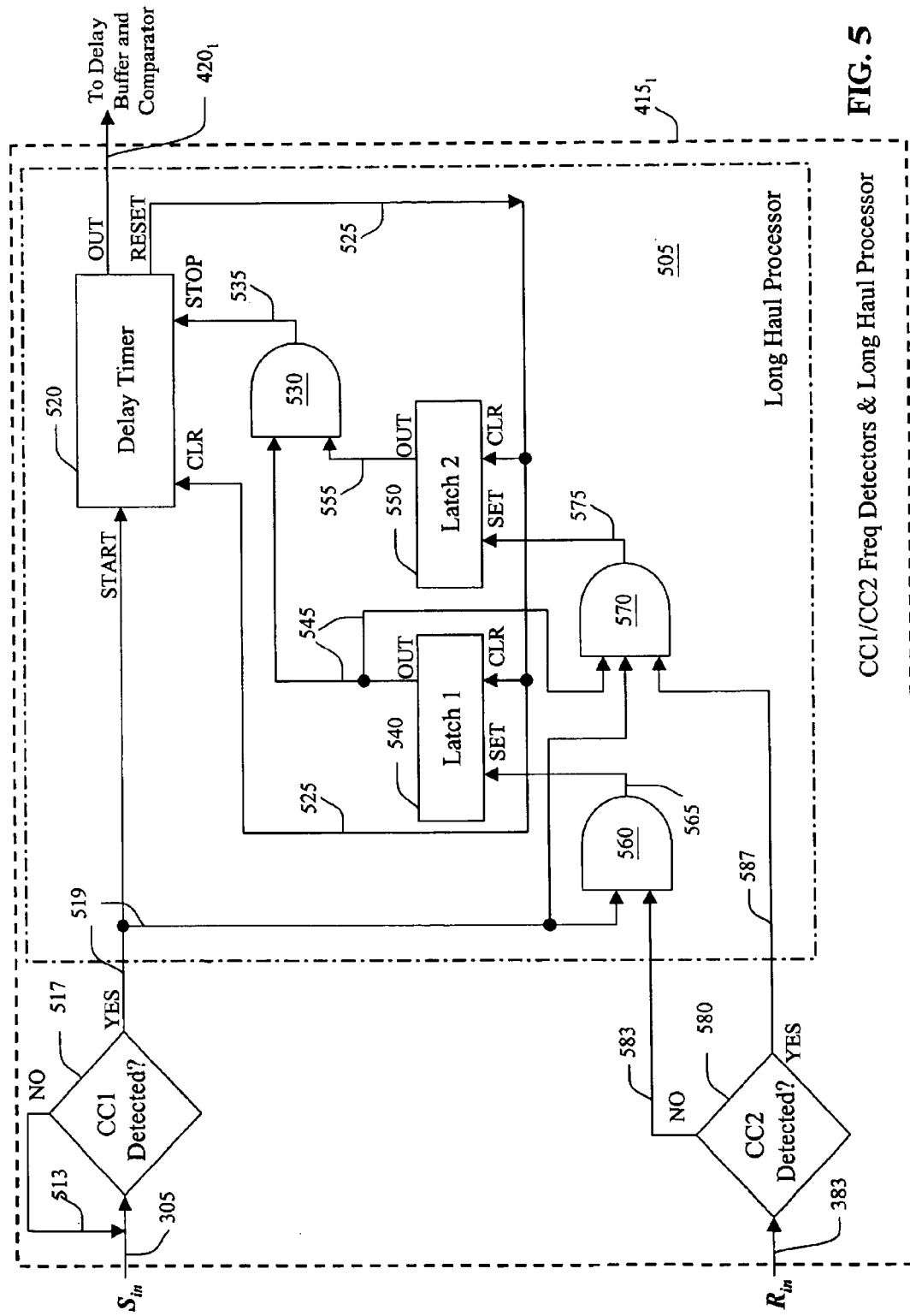
FIG. 5 depicts a block diagram of a logical implementation of CC1/CC2 frequency detectors and long haul processor 415$_1$ shown in FIG. 4.

In that regard, FIG. 5 depicts a logical block diagram of an implementation of any of the thirty-one CC1/CC2 frequency detectors and long haul processor circuits, and illustratively that of circuit $415_1$ shown in FIG. 4.

As shown in FIG. 5, circuit $415_1$ contains, from a logical perspective, CC1 and CC2 frequency detectors 517 and 580, respectively; and long haul processor 505 formed of: delay timer 520; AND gates 530, 560 and 570; and latches 540 and 550 (also denoted at latch 1 and latch 2, respectively).

An input signal appearing on input $S_{in}$ is routed, via lead 305, to an input of CC1 detector 517 which is symbolized as a decision block. As long as a CC1 tone is not detected, detector 517 routes control returns back to lead 305, via NO output path 513. Once that tone is detected, CC1 detector 517 produces a high level on its YES output path. That level is routed, via lead 519, to a Start input of delay timer 520 and to an input of each of AND gates 560 and 570. This high level starts delay timer 520 to begin timing a delay interval, typically in milliseconds. CC2 detector 580, which is also symbolized as a decision block, detects the presence of the CC2 frequency tone on the signal applied to the $R_{in}$ input. This signal is routed, via line 383, to detector 580. Until a CC2 tone appears on the $R_{in}$ input, decision block 580 produces a high level on its NO output, which, in turn, is applied, via lead 583, as another input to AND gate 560. The output of this gate is applied, via lead 565, to the SET input to latch 540 (Latch 1). As such, as soon as the CC1 tone is detected but before the occurrence of the CC2 tone, both inputs to AND gate 560 will become high. This, in turn, causes a high level to occur at the SET input of this latch 540 and, accordingly, a high level at an output (OUT) of this latch. The output of this latch is routed, via leads 545, to one input of AND gate 530 and to another input of AND gate 570. As long as the CC2 tone has not yet occurred, the YES output of CC2 detector 580 remains low. This output is routed, via lead 587, to another input of AND gate 570. Accordingly, with one of its input being low, AND gate 570 produces a low level at its output, which is routed via lead 575, to the SET input of latch 550 (latch 2). Hence, latch 2 remains reset, i.e., its output (OUT) remains low. Since this output is routed, via lead 555, to a second input of AND gate 530 (which also has the output of latch 1 routed to its first input), the output of this gate remains low. Accordingly, the delay timer continues to time the delay interval.

As soon as the CC2 tone is detected, the CC2 detector produces a high level on its YES output. This high level changes the third input of AND gate 570 from a low to a high which, with all three inputs to this AND gate being high, produces a high level at its output. This high level, being fed to the SET input of latch 550, sets this latch to produce a high output level. Inasmuch as the outputs of both latches 540 and 550 are now high, both inputs to AND gate 530 will transition from a low to a high value which, in turn; will produce a high level at a STOP input to delay timer 520. Hence, timer 520 will cease timing, i.e., stop. Its current contents will be the measured path length delay interval (in milliseconds). Also in response to a high level on the STOP input, these contents will be loaded, as the Channel 1 delay value, onto an internal output (OUT) register (not specifically shown) of the delay timer, and from there and via leads $420_1$, into a corresponding input of delay buffer and comparator 500 (see FIG. 4).

Once the delay timer has stored its contents into its internal output register, the timer produces a high level on its RESET output. The signal appearing at this output is routed, via lead 525, to the CLEAR (CLR) inputs of latches 540 and 550 and the delay timer itself. This high level will then reset the contents of both latches and clear the contents of the timer to zero; hence, preparing processor 505 for its next successive measurement of the path length delay interval.

Long haul processor 505 provides sufficient robustness against misdetection. First, the CC2 tone must occur while the CC1 tone is occurring, else neither latch 1 nor latch 2 will be set and processor 505 will not time any interval. This is ensured by virtue of the YES output of CC1 detector 517 being fed as an corresponding inputs to both AND gates 560 and 570, which, in turn and if this CC1 tone is not present, will inhibit the SET inputs to both latches. Second, if CC2 detector 580 detects the CC2 tone prior to the occurrence of the CC1 tone, AND gate 560 will inhibit the SET input to latch 1 and the START input to the delay timer 520 will remain low. Hence, the delay timer will not start timing. Should the CC1 tone occur but without any responsive CC2 tone, then delay timer 520 will simply time out. However, in this instance AND gate 530 will not produce a high level to the STOP input of the timer, hence the contents of the delay timer will never be stored in its internal output register; hence, that measurement will be ignored.

Though the present invention has been illustratively described in the context of utilizing a particular pre-defined tone(s) that routinely occurs during call signaling between ISCs, the invention is clearly not so limited. In particular, any predefined single tone(s) that is sent down a channel at a near-end location and then returned to the near-end location by equipment at a far-end location, or any predefined two-tone combination, where one tone is sent down that channel and second tone is returned over that channel can be utilized. The frequency of tone(s) is not critical provided the channel can propagate that tone from end-to-end and appropriate detection equipment is utilized to detect the presence of that tone(s) at the near-end echo canceller for measuring round-trip path delay. Furthermore, the invention is not even limited to using just audio tones, in fact, any other type of pulsed communication, be it, e.g., a predefined optical pulse(s) or electrical pulse, that can be carried round-trip over the channel and its presence detected at a near-end can be utilized for use in measuring round-trip path delay.

While the present invention preferably utilizes out-of-band signaling tones that occur during a call set-up interval, in-band signaling, i.e., occurring and being carried during an actual call connection after that connection has been established, could be used instead. However, in doing so, appropriate provisions would need to be made in the tone detection circuitry to differentiate the presence of the tone(s) for measuring round-trip path delay, from normal caller speech; otherwise, such speech—to the extent that it might contain frequency components (called "talk off") that constitute the tone(s)—could adversely influence detection of that tone(s).

Moreover, rather than separately detecting path delay for each different channel in a facility and then setting the echo delay for all the channels in that facility accordingly, as described above, path delay could be detected collectively for the entire facility. However, since this would not rely on using pre-existing call-setup tone sequences, doing so would likely entail additional circuit complexity as dedicated circuitry would probably need to added, in some fashion, to transmit and receive other appropriate tones or communication end-to-end across the entire facility to collectively measure, at the appropriate time, its round-trip path delay.

Although various an embodiment which incorporates the teachings of the present invention has been shown and described in considerable detail herein, those skilled in the art can readily devise many other embodiments and applications of the present invention that still utilize these teachings.

I claim:

1. Apparatus for an echo control device for use in canceling echo occurring in a communication channel and over a communication path that connects near- and far-end locations, the apparatus comprising:

a far-end echo canceller having a delay register, the delay register imparting a given amount of delay to an input signal applied to the far-end echo canceller and destined for transmission over the path to the far-end location; and a measurement circuit for measuring length of the path and adjusting, in response to the measured length, the given amount of delay provided by the delay register, wherein the measurement circuit comprises:

at least one detector for detecting first and second signals provided over the path so as to provide first and second detection outputs, respectively, wherein the first signal is provided by a first network switching system associated with the near-end location and the second signal is provided by a second network switching system associated with the far-end location and in response to reception of the first signal; and a long-haul processor, responsive to occurrence of first and second detection outputs, for measuring the path length and for providing a current delay value associated with the measured length, wherein the current delay value is used to set the given amount of delay provided by the register.

2. The apparatus in claim 1 wherein the processor measures an interval of time occurring between the occurrence of the first and second signals and, in response thereto, generates the current delay value.

3. The apparatus in claim 2 wherein the measurement circuit sets the delay register to the current delay value such that the register provides, as the given delay, the current delay value but only if the current delay value differs by at least a prescribed amount from a prior delay value to which the register has previously been set.

4. The apparatus in claim 3 wherein the prescribed amount is defined by a preset range centered about the prior delay value.

5. The apparatus in claim 4 wherein the preset range comprises, in magnitude, at least 5% of the prior delay value.

6. The apparatus in claim 2 wherein the interval of time is measured during a call set-up interval associated with the channel.

7. The apparatus in claim 6 wherein the first and second signals are the same frequency.

8. The apparatus in claim 7 wherein the first and second tones are each approximately 2000 Hz which serve as continuity check tones used in ITU-T No. 7 signaling.

9. The apparatus in claim 6 wherein the first and second signals comprise a predefined call signaling tone sequence having two different predefined tones.

10. The apparatus in claim 9 wherein the first and second signals are approximately 2400 Hz and 2600 Hz, respectively.

11. Apparatus for an echo control device for use in canceling echo occurring over a communications facility that carries multiple communication channels over a communication path that connects near- and far-end locations, the apparatus comprising, for each channel:

a corresponding one of a plurality of far-end echo cancellers, said corresponding far-end echo canceller having an associated delay register, the associated delay register imparting a given amount of delay to an input signal applied to the corresponding echo canceller and destined for transmission over said channel and the path to the far-end location; and a corresponding one of a plurality of measurement circuits for measuring length of the path and adjusting, in response to the measured length, the given amount of delay provided by the associated delay register, wherein the corresponding one measurement circuit comprises:

at least one detector for detecting first and second signals provided over said each channel and through the path so as to provide first and second detection outputs, respectively, wherein the first signal is provided by a first network switching system associated with the near-end location and the second signal is provided by a second network switching system associated with the far-end location and in response to reception of the first signal; and a long-haul processor, responsive to occurrence of first and second detection outputs, for measuring the path length for said each channel and for providing a current delay value associated with the measured path length for said each channel, wherein the current delay value is used to set the given amount of delay provided by the associated delay register.

12. The apparatus in claim 11 wherein the processor measures an interval of time occurring between the occurrence of the first and second signals and, in response thereto, generates the current delay value.

13. The apparatus of claim 12 wherein the current delay value produced by each of the measurement circuits defines a plurality of current delay values across all of the measurement circuits and the associated delay register for each of the measurement circuits has previously been set to a common delay value, and further comprising:

a comparator and buffering circuit, responsive to each one of the plurality of the current delay values, wherein the comparator and buffering circuit ascertains which one of the plurality of current delay values differs most from the common delay value so as to define a new delay value and then sets all the delay registers to provide the new delay value.

14. The apparatus in claim 13 wherein the comparator and buffering circuit only sets all of the delay registers to the new delay value if the new delay value differs by at least a prescribed amount from the common delay value.

15. The apparatus in claim 14 wherein the prescribed amount is defined by a preset range centered about the prior delay value.

16. The apparatus in claim 15 wherein the preset range comprises, in magnitude, at least 5% of the prior delay value.

17. The apparatus in claim 13 wherein the interval of time is measured during a call set-up interval associated with said each channel.

18. The apparatus in claim 17 wherein the first and second signals are the same frequency.

19. The apparatus in claim 18 wherein the first and second tones are each approximately 2000 Hz which serve as continuity check tones used in ITU-T No. 7 signaling.

20. The apparatus in claim 17 wherein the first and second signals comprise a predefined call signaling tone sequence having two different predefined tones.

21. The apparatus in claim 21 wherein the first and second signals are approximately 2400 Hz and 2600 Hz, respectively.

22. In apparatus for an echo control device for use in canceling echo occurring in a communication channel and over a communication path that connects near- and far-end locations, the echo control device comprising a far-end echo canceller having a delay register, a method comprising the steps of:

imparting, through the delay register, a given amount of delay to an input signal applied to the far-end echo canceller and destined for transmission over the path to the far-end location; and measuring length of the path and adjusting, in response to the measured length, the given amount of delay provided by the delay register, wherein the measuring step comprises the steps of:

detecting first and second signals provided over the path so as to provide first and second detection outputs, respectively, wherein the first signal is provided by a first network switching system associated with the near-end location and the second signal is provided by a second network switching system associated with the far-end location and in response to reception of the first signal; and determining, in response to the occurrence of the first and second detection outputs, the path length and for providing a current delay value associated with the measured length, wherein the current delay value is used to set the given amount of delay provided by the register.

23. The method in claim 22 wherein the determining step comprises the step of measuring an interval of time occurring between the occurrence of the first and second signals and, in response thereto, generates the current delay value.

24. The method in claim 23 wherein the determining step further comprises the step of setting the delay register to the current delay value such that the register provides, as the given delay, the current delay value but only if the current delay value differs by at least a prescribed amount from a prior delay value to which the register has previously been set.

25. The method in claim 24 wherein the prescribed amount is defined by a preset range centered about the prior delay value.

26. The method in claim 25 wherein the preset range comprises, in magnitude, at least 5% of the prior delay value.

27. The method in claim 23 wherein the interval of time is measured during a call set-up interval associated with the channel.

28. The method in claim 27 wherein the first and second signals are the same frequency.

29. The method in claim 28 wherein the first and second tones are each approximately 2000 Hz which serve as continuity check tones used in ITU-T No. 7 signaling.

30. The method in claim 27 wherein the first and second signals comprise a predefined call signaling tone sequence having two different predefined tones.

31. The method in claim 30 wherein the first and second signals are approximately 2400 Hz and 2600 Hz, respectively.

32. In apparatus for an echo control device for use in canceling echo occurring over a communications facility that carries multiple communication channels over a communication path that connects near- and far-end locations, the apparatus comprising, for each channel, a corresponding one of a plurality of far-end echo cancellers, said corresponding far-end echo canceller having an associated delay register, the method comprising the steps of:

imparting, through the associated delay register, a given amount of delay to an input signal applied to the corresponding far-end echo canceller and destined for transmission over said channel and the path to the far-end location; and measuring length of the path and adjusting, in response to the measured length, the given amount of delay provided by the associated delay register, wherein the measuring step comprises the steps of:

detecting first and second signals provided over said each channel and through the path so as to provide first and second detection outputs, respectively, wherein the first signal is provided by a first network switching system associated with the near-end location and the second signal is provided by a second network switching system associated with the far-end location and in response to reception of the first signal; and determining, in response to the occurrence of the first and second detection outputs, the path length for said each channel and for providing a current delay value associated with the measured path length for said each channel, wherein the current delay value is used to set the given amount of delay provided by the associated delay register.

33. The method in claim 32 wherein the determining step further comprises the step of measuring an interval of time occurring between the occurrence of the first and second signals and, in response thereto, generates the current delay value.

34. The method of claim 33 wherein the current delay value produced by each of the measurement circuits defines a plurality of current delay values across all of the measurement circuits and the associated delay register for each of the measurement circuits has previously been set to a common delay value, and wherein the determining step further comprises the step of:

ascertaining, in response to each one of the plurality of the current delay values, which one of the plurality of current delay values differs most from the common delay value so as to define a new delay value and then setting all the delay registers to provide the new delay value.

35. The method in claim 34 wherein the ascertaining and setting step comprises the step of only setting all of the delay registers to the new delay value if the new delay value differs by at least a prescribed amount from the common delay value.

36. The method in claim 35 wherein the prescribed amount is defined by a preset range centered about the prior delay value.

37. The method in claim 36 wherein the preset range comprises, in magnitude, at least 5% of the prior delay value.

38. The method in claim 34 wherein the interval of time is measured during a call set-up interval associated with said each channel.

39. The method in claim 38 wherein the first and second signals are the same frequency.

40. The method in claim 39 wherein the first and second tones are each approximately 2000 Hz which serve as continuity check tones used in ITU-T No. 7 signaling.

41. The method in claim 38 wherein the first and second signals comprise a predefined call signaling tone sequence having two different predefined tones.

42. The method in claim 41 wherein the first and second signals are approximately 2400 Hz and 2600 Hz, respectively.

* * * * *